United States Patent [19]

Few et al.

[11] Patent Number: 5,673,550
[45] Date of Patent: Oct. 7, 1997

[54] LASER INITIATED NON-LINEAR FUEL DROPLET IGNITION

[75] Inventors: Jimmy D. Few; James W. L. Lewis, both of Tullahoma, Tenn.

[73] Assignee: University of Tennessee Research Corporation, Knoxville, Tenn.

[21] Appl. No.: 455,193

[22] Filed: May 31, 1995

Related U.S. Application Data

[62] Division of Ser. No. 289,184, Aug. 11, 1994, which is a continuation of Ser. No. 957,613, Oct. 6, 1992, Pat. No. 5,404,712.

[51] Int. Cl.$^6$ .................................................. F02C 7/264
[52] U.S. Cl. ............................................................ 60/39.06
[58] Field of Search .............................. 60/39.06, 39.821, 60/39.826, 39.828; 123/143 B, 143 R; 431/1, 2, 6, 258

[56] References Cited

U.S. PATENT DOCUMENTS

| | | | |
|---|---|---|---|
| 3,258,910 | 7/1966 | Seymour | 60/39.821 |
| 3,473,879 | 10/1969 | Berberich | 60/39.821 |
| 3,861,371 | 1/1975 | Gamell | 431/1 |
| 4,035,131 | 7/1977 | Cerkanowicz | 60/39.821 |
| 4,302,933 | 12/1981 | Smith | 60/39.821 |
| 4,314,530 | 2/1982 | Giacchetti | 123/143 R |
| 4,343,687 | 8/1982 | Ronn | 204/157.41 |
| 4,416,226 | 11/1983 | Nishida et al. | 123/143 B |
| 4,434,753 | 3/1984 | Mukainakano et al. | 123/143 B |
| 4,556,020 | 12/1985 | Hickling | 431/6 |
| 4,726,336 | 2/1988 | Hoppie et al. | 123/143 B |
| 4,947,640 | 8/1990 | Few et al. | 60/39.821 |
| 5,404,712 | 4/1995 | Few et al. | 60/39.821 |

FOREIGN PATENT DOCUMENTS

| | | |
|---|---|---|
| 1236561 | 6/1971 | United Kingdom . |
| 1360196 | 7/1974 | United Kingdom . |

OTHER PUBLICATIONS

Brad E. Forch et al., Technical Report BRL-TR-27409, U.S. Army Ballistic Research Laboratory, entiteld "Photochemical Ignition Studies II" . . . Jun. 1986.

Andrezik W. Miziolek et al. Technical Report BRL-TR-2644, U.S. Army Ballistic Research Laboratory, "Photochemical Ignition Studies. I. Laser Ignition of Flowing Premixed Gases", Feb. 1985.

Lavid et al., "Photochemical Ignition of Premixed Hydrogen/Oxidizer Mixtures With Eximer Lasers". pp. 1–4, (no date).

M. Lavid, "Photochemical Ignition of Gaseous Mixtures", pp. 97–100. (no date).

E. Dabora, "Laser Ignition of Liquid Fuel Drops", pp. 119–133. 7th ICOGER. Gottingen. Fed. Rep. of Germany, Aug. 20–24, 1979.

(List continued on next page.)

*Primary Examiner*—Timothy S. Thorpe
*Attorney, Agent, or Firm*—Perman & Green

[57] ABSTRACT

Method and apparatus for igniting an air/fuel spray (26) comprised of fuel droplets. The apparatus includes a coherent optical source (12) for introducing at least one pulse of coherent radiation into the air/fuel spray. The pulse generates free electrons and initiates a development of a plasma within the air/fuel spray. The coherent source maintains the pulse of coherent radiation and pumps the developing plasma to higher energies. The pulse is terminated at a time after the plasma has reached a predetermined energy and before ignition of the air/fuel spray. The non-linear ignition system of the invention employs a gas/vapor interface region at a fuel droplet surface and an electric field that extends from and exists outside of a fuel droplet. Free electrons are accelerated to higher energies by the electric field surrounding the fuel droplet. The accelerated electrons initiate a breakdown near adjacent fuel droplets and the liberation of further free electrons. In a short period of time an avalanche process occurs that creates a high density of free electrons and ions which results in the formation of a plasma.

4 Claims, 1 Drawing Sheet

OTHER PUBLICATIONS

Lavid et al., "Infrared Multiphoton Ignition of Alcohols", pp. 69-1-69-4. Chemical and Physical Processes in Combustion 1986 (no month provided).

M. Lavid, "Radiative Augmented Combustion", Annual Technical Report AFOSR-TR Aug. 1984.

M. Lavid et al., "Infrared multiphoton Ignition and Enhancement of Combustion", Final Report, NSF Grant No. CBT-8560667 (1986) Aug.

M. Lavid, "Radiation/Catalytic Augmented Combustion", Interim Scientific Report, Contract No. F49620-81-C-0028, 1982, May.

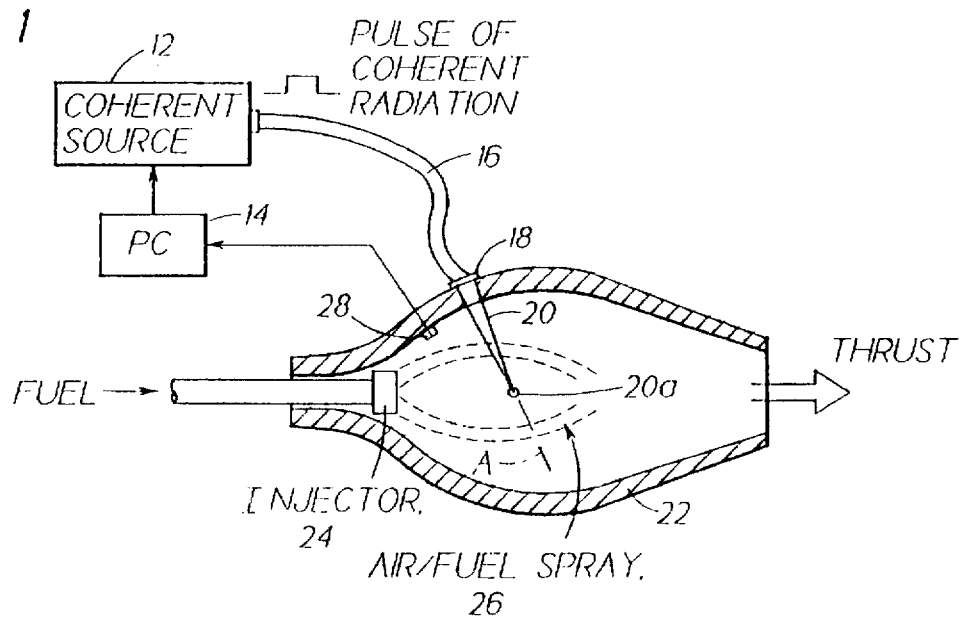
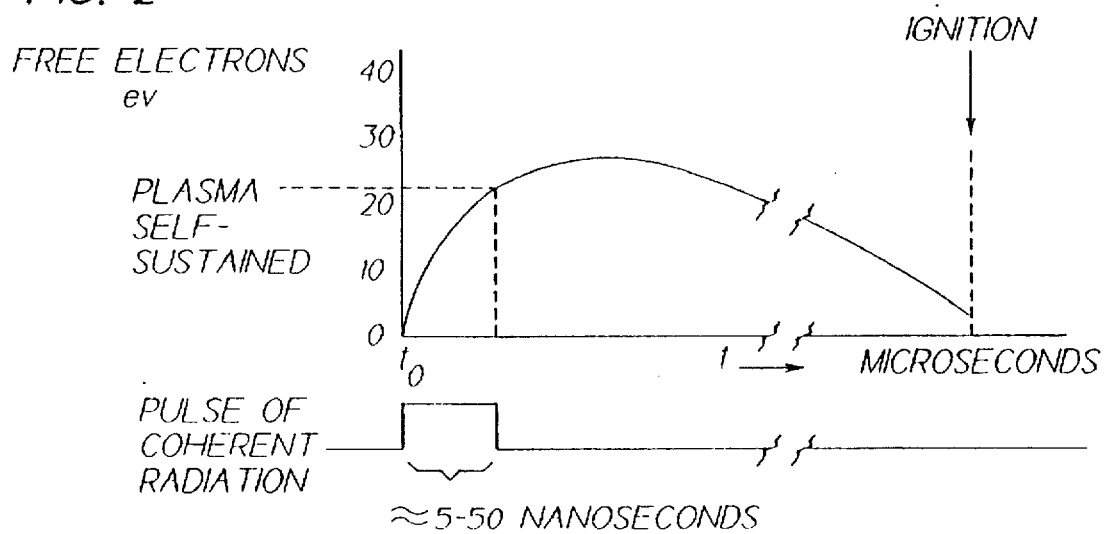
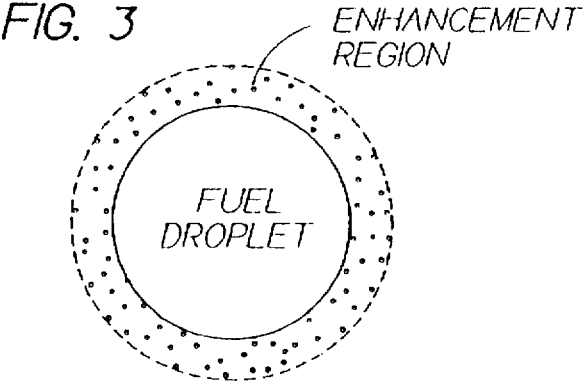
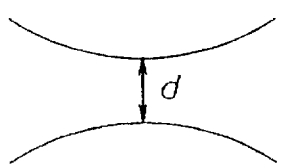

LASER INITIATED NON-LINEAR FUEL DROPLET IGNITION

This is a divisional of copending application(s) Ser. No. 08/289,184 filed on Aug. 11, 1994, which is a continuation of Ser. No. 07/957,613, filed Oct. 6, 1992, now U.S. Pat. No. 5,404,712.

FIELD OF THE INVENTION

This invention relates generally to ignition systems and, in particular, to the ignition of fuel droplets by a laser initiated process.

BACKGROUND OF THE INVENTION

The laser ignition of fuel droplets, such as those found in the combustion chamber of a gas turbine engine, provides several significant advantages over conventional spark plug type ignitors. For example, with a laser ignitor the combustion process can be started in a more optimum chamber position. Spark ignitors are typically positioned at a peripheral, non-optimal position of a combustion chamber, while the fuel spray to be ignited is located in a central portion adjacent to a fuel injector. Also, a laser ignition system that operates outside the combustion chamber, with an appropriate optical coupling into the fuel spray, is not subject to the type of degradation experienced by internally mounted spark ignitors. This degradation of spark ignitors is known to cause eventual failure after prolonged use.

In U.S. Pat. No. 4,947,640, issued Aug. 14, 1990, entitled "Gas Turbine Engine Photon Ignition System", two of the present inventors describe method and apparatus for igniting a hydrocarbon fuel that is comprised of droplets of hydrocarbon fuel. The hydrocarbon fuel is provided as an air/fuel spray. Electromagnetic radiation having wavelengths primarily within a range of approximately 185 nm to approximately 400 nm (UV) is generated and directed into the air/fuel spray. The droplets absorb the energy, are heated, fragmented and ignited. The use of electromagnetic radiation within the ultraviolet region is shown to be beneficial because of a high absorption of radiation within this wavelength range by hydrocarbon fuels such as JP-4 and JP-5.

The following U.S. and foreign patents are cited as relating to the ignition of and/or the preconditioning of fuels with electromagnetic energy:

U.S. Pat. No. 4,035,131, issued Jul. 12, 1977, entitled "Control of the Initiation of Combustion and Control of Combustion" by A. E. Cerkanowicz; U.S. Pat. No. 4,726,336, issued Feb. 23, 1988, entitled "UV Irradiation Apparatus and Method for Fuel Pretreatment Enabling Hypergolic Combustion" by L. O. Hoppie et al.; U.S. Pat. No. 3,258,910, issued Jun. 8, 1962, entitled "Fiber Optics Ignition" by R. J. Seymour; U.S. Pat. No. 3,473,879, issued Oct. 21, 1969, entitled "Shock Wave Burner" by B. Berberich; U.S. Pat. No. 3,861,371, issued Jan. 21, 1975 entitled "Ignition System for Engine" to J. Gamell; U.S. Pat. No. 4,416,226, issued Nov. 22, 1983, entitled "Laser Ignition Apparatus for an Internal Combustion Engine" by M. Nishida et al.; U.S. Pat. No. 4,434,753, issued Mar. 6, 1984, entitled "Ignition Apparatus for Internal Combustion Engine" to Mukainakano et al.; and two U.K. Patents to D. Brown, both entitled "Ignition Systems", specifically: 1,236,561, published Jun. 23, 1971, and 1,360,196 published, Jul. 17, 1974.

The following two technical reports are cited for teaching the ignition of premixed flowing gases with electromagnetic energy: Brad E. Forch et al., Technical Report BRL-TR-27409, U.S. Army Ballistic Research Laboratory, entitled "Photochemical Ignition Studies. II Oxygen-Atom Two-Photon Resonance Effects", June, 1986; and Andrezik W. Miziolek et al. Technical Report BRL-TR-2644, U.S. Army Ballistic Research Laboratory, "Photochemical Ignition Studies. I. Laser Ignition of Flowing Premixed Gases" February 1985.

Finally, in U.S. Pat. No. 4,302,933, issued Dec. 1, 1981, entitled "Jet Engine Augmentor Operation at High Altitudes" by Marvin M. Smith there is disclosed a pulsed $CO_2$ TEA laser that is employed to generate laser-supported absorption (LSA) waves within a jet engine augmentor. The LSA waves are initiated by a laser beam reflecting off of targets, such as fuel droplets, in the eye of a cyclonic air action in a recirculation zone of the augmentor. This is said to cause the emission of electrons which serve as priming electrons to break down air into a plasma of high temperature ($10,000°$ to $20,000°$ K.). The LSA waves are said to be initiated by directing a 10.6 micron wavelength converging beam having a minimum intensity of $6 \times 10^8 W/cm^2$. The air breakdown is said to proceed via inverse bremsstrahlung heating. It is stated that a hot air plasma of 1–2 ev is formed which propagates back up the laser beam away from the formed plasma where most of the laser beam energy is absorbed. The system of Smith is said to measure the ambient air pressure and to vary the pulse repetition rate of the laser such that the fuel-air ratio in the wave combustion is continuously maintained at a high thermal efficiency. Smith also makes reference to the use of "additives" that may be used in conjunction with the fuel.

The teaching of Smith does not address the problem of low powered and light-weight laser ignition systems for use within a gas turbine engine combustor. As is evident from his disclosure, Smith envisions a high powered laser source to generate LSA waves within the engine augmentor.

However, one important criteria for an aircraft laser ignition system is that the system be a low powered system having a small physical size and weight. It is thus one object of this invention to provide for a laser initiated ignition of a fuel spray within a combustion chamber with a low powered laser source.

It is a further object of this invention to provide for a laser initiated non-linear ignition process of a fuel spray within a combustion chamber of a gas turbine engine.

SUMMARY OF THE INVENTION

The foregoing and other problems are overcome and the objects of the invention are realized by method and apparatus for igniting an air/fuel spray comprised of fuel droplets. The apparatus includes a laser optical source for introducing at least one pulse of coherent optical radiation into the air/fuel spray. The radiation source provides a light pulse that generates free electrons and initiates a development of a plasma within the air/fuel spray. The source maintains the pulse of laser radiation and pumps the developing plasma to higher energies. The pulse is terminated at a time after the plasma has reached a predetermined energy and before ignition of the air/fuel spray.

In accordance with the invention, the pulse width of the incident laser beam may be made relatively short as compared to the amount of time to achieve ignition, thereby achieving low powered operation. The process of plasma generation occurs within several tens of nanoseconds after the laser pulse is introduced into a combustion chamber, such as a combustion chamber associated with a gas turbine engine. The actual, global ignition of the air/fuel spray may not occur for up to some number of microseconds after the pulse is first applied. However, the pulse width of the laser source can be made significantly shorter than the amount of time that elapses between plasma development and the ignition of the air/fuel spray. That is, the pulse of coherent, laser radiation is introduced and removed within a period of time that is less than a time required to achieve ignition. In accordance with the teaching of the invention, the pulse of coherent radiation initiates the development of the plasma, and then pumps the plasma to an energy at which the plasma becomes self-sustaining. This advantageously provides for a relatively low powered operation as compared to the prior art.

The non-linear ignition system of the invention employs a gas/vapor interface region at the fuel droplet surface and an electric field that extends from and exists outside of a fuel droplet. The shape and extent of the electric field is a function of the index of refraction of the droplet at the laser wavelength, the droplet size, the droplet composition, and other factors. Free electrons are accelerated to higher energies by the electric field surrounding the fuel droplet. These accelerated electrons initiate a breakdown near adjacent droplets and the liberation of additional free electrons. In a short period of time an avalanche process occurs that creates a high density of free electrons and ions which form a plasma.

In accordance with a method of igniting an air/fuel spray comprised of fuel droplets there are disclosed the steps of (a) providing the air/fuel spray within a combustion chamber; (b) introducing at least one pulse of coherent radiation into the air/fuel spray, the at least one pulse interacting with free electrons and initiating a development of a plasma within the air/fuel spray; (c) maintaining the at least one pulse of coherent radiation for pumping the developing plasma; and (d) terminating the at least one pulse of coherent radiation at a time after the plasma has reached a predetermined energy and before ignition of the air/fuel spray.

BRIEF DESCRIPTION OF THE DRAWING

The above set forth and other features of the invention are made more apparent in the ensuing Detailed Description of the Invention when read in conjunction with the attached Drawing, wherein:

FIG. 1 is a block diagram showing the laser ignition system of the invention coupled to a combustion chamber of a gas turbine engine for igniting a fuel spray therein;

FIG. 2 is a graph showing, as a function of time, the energy of free electrons of a plasma that is laser-initiated within a combustion chamber;

FIG. 3 is an enlarged view, not to scale, of a fuel droplet and the enhancement region surrounding the droplet; and FIG. 4 is an illustration of a focal region of a laser beam.

DETAILED DESCRIPTION OF THE INVENTION

Referring to FIG. 1 there is shown a laser ignition system constructed and operated in accordance with the invention. The system includes a coherent source or laser 12 having a pulse controller (PC) 14 coupled thereto. It should be understood that the coherent source 12 may include, if desired, frequency doubling or tripling apparatus, Q-switching apparatus, and/or other optical devices. An output of the laser 12 is optically coupled to a radiation delivery means, such as, for example, an optical fiber 16 which delivers the laser radiation to a focussing element 18.

The focussing element 18 provides a focussed beam 20 of laser radiation. The focussed beam 20 is directed to within a combustion chamber 22. The combustion chamber 22 is preferably the combustion chamber of a gas turbine engine, although other combustion chamber embodiments also benefit from the teaching of the invention. A fuel injector 24 is provided for introducing an air/fuel spray 26 into the combustion chamber 22. The air/fuel spray 26 includes fuel droplets having a diameter within a range, typically, of 20 micrometers to 1000 micrometers or greater. The mean diameter of fuel droplets within the air/fuel spray 26 is a function of several parameters, including fuel temperature and the design of the injector 24. The focussed beam 20 is positioned such that the focal point 20a is located within the fuel spray 26. Positioning the focal point 20a within the fuel spray 26 increases the probability that one or more fuel droplets will be at the focal point 20a.

In FIG. 1 the focussing element 18 may be a lens, or may be embodied in a self-focussing type of optical fiber. Also, it is within the scope of the invention to provide a plurality of fiber optic conductors 18 for providing a plurality of focussed beams 20 within the fuel spray 26, thereby increasing the probability that the non-linear ignition process will be initiated.

Also, it is within the scope of the invention to provide a feedback mechanism for varying a pulse rate and/or a pulse width of the laser 12. In FIG. 1 this feedback mechanism includes a silicon photodiode 28 that is responsive to wavelengths associated with the flame within the combustion chamber 22. The silicon photodiode 22 generates a signal indicating that ignition has been achieved, the signal being fed back to the pulse controller 14 for disabling the pulsing of the laser 12. This feedback mechanism may also be employed to advantage if the flame within the combustion chamber 22 is lost, so as to reinitiate the ignition process by enabling the laser 12 to generate pulses. Manual control of the laser 12 operation is generally always provided.

In accordance with the invention the ignition of the air/fuel spray 26 proceeds by a non-linear process, as opposed to a linear process. In a linear process, the fuel droplets absorb the electromagnetic radiation and are heated thereby to an ignition temperature. Although providing ignition, the linear system typically requires significantly more input power than the non-linear process described herein.

In contradistinction to the linear system, the non-linear ignition system of the invention relies upon a gas/vapor interface region at the droplet surface and upon an electric field that extends from and exists outside of a fuel droplet. This electric field is generated by the interaction of the droplet and the laser energy contained within the pulsed beam 20. The shape and extent of this electric field is a function of the index of refraction of the droplet at the laser wavelength, the droplet size, the droplet composition, and other factors.

Referring to FIG. 2 it can be seen that a pulse of coherent radiation having a predetermined pulse width and power density is introduced into the combustion chamber 22 at time ($t_o$). The focussed pulse initiates a breakdown process, including the formation of a shock wave. Initially, typically but a few free electrons are generated from the gas/vapor surrounding a fuel droplet. These free electrons are then accelerated to higher energies by the aforementioned electric field surrounding the fuel droplet. These accelerated electrons initiate a breakdown in the gas/vapor surrounding adjacent droplets and the liberation of further free electrons.

Initially, free electron movement is approximately collinear with the axis (A) of the focussed beam 20. However, as the plasma builds the electron movement diverges from the axis (A) of the beam 20 and rapidly spreads throughout the air/fuel spray 26. The free electrons are accelerated to higher energies, forming "hot" electrons, which extend over a large area of the combustion chamber 22. The plasma of free electrons and ions that is generated within the combustion chamber 22 may have a temperature approaching 20,000 K.

As employed herein, a plasma is considered to be a gaseous region containing free electrons and ions at a given density or concentration. Typical electron/ion densities associated with plasmas are in the range of $10^8$ cm$^{-3}$ to $10^{10}$ cm$^{-3}$. It has been found that the use of the invention results in a plasma having significantly higher densities in the range of $10^{16}$ cm$^{-3}$ to $10^{18}$ cm$^{-3}$. The pulse of laser energy is maintained for pumping the developing plasma to at least a point whereat the plasma becomes self-sustaining; that is, to a point where the plasma will exist for a period of time without requiring input energy from the laser beam. As employed herein, the point at which the plasma becomes self-sustained is considered to be at free electron energies in the range of approximately 20 electron volts (ev) to approximately 30 ev.

The plasma generation is believed to operate by a multi-photon process wherein bound electrons absorb several photons, each photon of lesser energy than an ionization energy. For example, a laser beam of approximately one micrometer wavelength initially generates free electrons having energies of approximately one electron volt. Absorption of several such low energy photons by an electron bound to an oxygen atom, within a relatively short period of time, results in the electron absorbing sufficient energy to cause the atom to become ionized. The resulting ionized oxygen atom thus contributes a free electron to the plasma.

The actual ignition of the air/fuel spray is believed to proceed primarily by a diffusion and recombination process. The fully developed, self-sustaining plasma contains free electrons and ions. As the plasma begins to cool, free electrons are captured by ions to create neutral, excited atoms. These neutral, excited atoms in turn create neutral, excited molecules/atoms which are the precursors to ignition. The recombination process that results in ignition may require several microseconds, as indicated by FIG. 2. At the time of ignition, the remaining free electrons are believed to have energies on the order of approximately one to approximately five electron volts.

Initially, it has been found that the fuel spray 26 appears substantially transparent to the laser beam 20, and relatively little absorption of the beam 20 occurs. However, as the plasma builds within the combustion chamber 22 the absorption of the laser pulse 20 has been found to increase until, finally, the energy of the laser pulse 20 is almost totally absorbed by the plasma. Laser energy absorptions of 90–95% are typical for the fully developed plasma. This increased absorption further heats the plasma and "pumps" the plasma energy to higher levels.

As was stated, for a laser with an approximately one micrometer wavelength the energy of the free electrons is initially approximately one electron volt. However, after the plasma is developed energies of approximately 30 electron volts may be achieved. In this regard it is noted that energies of approximately 10 electron volts are required to disassociate a molecule, while 15 electron volts is sufficient to ionize oxygen molecules. Thus, it can readily be seen that energies significantly above that required to ionize the oxygen molecules are present within the plasma of the combustion chamber.

As can be seen in FIG. 2, the pulse width of the incident laser beam 20 is relatively short compared to the amount of time to achieve ignition. That is, the process of plasma generation occurs within several tens of nanoseconds after the laser pulse is introduced into the combustion chamber 22. However, the actual, global ignition of the fuel spray 26 may not occur for up to some number of microseconds. As a result, the pulse width of the laser radiation can be made significantly shorter than the amount of time that elapses between plasma development and the ignition of the air/fuel spray 26. That is, the pulse of coherent radiation is introduced into the combustion chamber to initiate plasma development, maintained at least until the plasma becomes self-sustained, and then removed, all within a period of time that is less than a time required to achieve ignition. This advantageously provides for a low powered operation, relative to the linear systems of the prior art, and to the high powered system described by Smith in the above-mentioned U.S. Pat. No. 4,302,933. As was noted above, Smith generates a LSA wave, that is, a propagating thermal wave. The laser of Smith is thus required to maintain the plasma so as to provide the thermal wave.

More specifically, the generation of an LSA-wave is consistent with a longer pulsewidth (microsecond) laser source. In contradistinction, the pulsewidth taught by this invention, which is on the order of nanoseconds, is sufficiently short such that the formation of an absorption wave is unlikely. That is, the formation time of such a wave is believed to be much greater than the pulsewidth of the source 12. This invention requires only that the free electrons absorb the laser energy. It is further believed that the subsequent electron motion is not solely toward the laser source, as is indicated in U.S. Pat. No. 4,302,933.

The ignition process utilizes the presence of free electrons. These electrons may be naturally present, or may be the result of photoionization processes from gaseous or vapor species of the fuel droplet itself. As seen in FIG. 3, the droplet provides a region near the surface for which there is an enhancement of the electric field produced by the laser source/fuel droplet interaction. This enhancement region has an approximate thickness of 1 wavelength. Significantly, there is no requirement for an eye of a cyclonic air action as stated in U.S. Pat. No. 4,302,933.

As has been previously described, the teaching of this invention is directed towards providing a low powered ignition system. This aspect of the invention is made apparent by a comparison with the system described in U.S. Pat. No. 4,302,933. A minimum converging beam intensity that is disclosed in U.S. Pat. No. 4,302,933 is $6 \times 10^8$ W/cm$^2$ (utilizing a 10.6 micron wavelength).

FIG. 4 illustrates a focal region of a laser, where d is a minimum diameter of a focal volume. A minimum intensity $I_{min}$ is given by $$I_{min} = P / \left( \frac{\pi d^2}{4} \right) \cong \frac{P}{d^2} \tag{1}$$

The minimum d is a function of the laser wavelength $\gamma$ $$d \cong 2 \cdot \left( \frac{f}{D} \right) \cdot \lambda = C \cdot \lambda \tag{2}$$

where f is the focal length of a laser focusing element (lens) and D is the diameter of the beam; i.e., f/D is optics controlled. Now, $$I_{min} \cong \frac{P}{C^2 \lambda^2} \quad (3)$$

Assuming that $I_{min}$ is equal for both applications; i.e., the low powered system of this invention and the system disclosed in U.S. Pat. No. 4,302,933, then $$\frac{P(10.6\mu)}{P(\lambda)} = \left(\frac{10.6}{\lambda}\right)^2 \quad (4)$$

where $\gamma(\mu m)$ represents wavelength.

Assuming a wavelength of $\gamma \approx 1$ μm for this embodiment of the invention, then $$P(10.6 \, \mu) \cong 100 P(1 \, \mu) \quad (5)$$

As can be seen, a minimum power required by the system disclosed in U.S. Pat. No. 4,302,933, operating at 10.6 μm is approximately 100 times as large as that required for the source 12 operating at approximately 1 μm.

In accordance with a method of this invention for igniting an air/fuel spray that is comprised of fuel droplets, the following steps are accomplished: (a) providing the air/fuel spray within a combustion chamber; (b) introducing at least one pulse of coherent radiation into the air/fuel spray, the at least one pulse interacting with free electrons and initiating a development of a plasma within the air/fuel spray; (c) maintaining the at least one pulse of coherent radiation for pumping the developing plasma to higher energies; and (d) terminating the at least one pulse of coherent radiation at a time after the plasma has reached a predetermined energy and before a time that ignition of the air/fuel spray occurs.

As can be appreciated, the laser beam should exhibit certain preferred characteristics to achieve low powered, non-linear ignition. These characteristics of the laser beam include the coherency of the laser beam, the pulse width, and the power density.

The index of refraction of the fuel to be ignited is also a consideration, in that both the electric field strength and electric field shape external to the droplet are known to be a function of the index of refraction of the droplet at the laser wavelength.

In accordance with an embodiment of the invention for use with, by example, a fuel such as JP/4, JP-5, or JP-8; the laser 12 includes a Nd:YAG laser having a wavelength of 1.064 micrometers, or the frequency doubled (0.532 micron), or frequency tripled (0.355 micron) wavelength. That is, the wavelength is within a range of approximately 0.3 micrometers to approximately 1.1 micrometers. The coherency of the beam is a consideration, in that a multi-mode beam generates interference effects within the combustion chamber due to mutual interference of the different wavelengths. As a result, any droplets located within a fringe region wherein the laser power is minimized due to destructive interferences may not experience sufficient energy to initiate the non-linear ignition process. Thus, a single mode, or approximately single mode, beam is preferred, although not absolutely required. A preferred pulse width for the Nd:YAG laser is within a range of approximately five to approximately 50 nanoseconds, and the power density is within a range of approximately $10^7$ to approximately $10^8$ W/cm². The coherency is assumed to be such that the laser light pulse energy can be focussed to a beam cross-section, circular area of typically 100 microns in diameter.

It is noted that the process of the invention is not wavelength critical, but is wavelength sensitive. That is, in contradistinction to the selection of an electromagnetic wavelength that is highly absorbed by the particular fuel that comprises the droplet, as is done for a linear ignition system such as that described in the above referenced U.S. Pat. No. 4,947,640, the selected wavelength may be employed with a number of different types of fuels.

In this regard it is also noted that although the primary ignition mechanism is the non-linear process, employing the electric field outside of the fuel droplet, some absorption and localized heating of the fuel droplets may occur within the fuel spray. For increased laser fluence (radiation energy per area) directed to the combustor, linear heating effects may dominate the non-linear effects and the system may revert to a linear ignition system. However, in that it is desirable to minimize the fluence to the combustion chamber 22 to provide low powered operation, the ignition process is typically and preferably dominated by the non-linear process described herein.

It is within the scope of the invention to employ a fuel additive, such as a low ionization threshold compound. In that only a very few electrons are required to initiate the ignition process, due to the pumping of the plasma and the free electron avalanche that results therefrom, only trace quantities of a photoemissive compound may be required to be added to the fuel. This is advantageous in that the fuel properties are not significantly affected by the addition of only trace quantities.

Although described in the context of a combustion chamber for a gas turbine engine it should be realized that the teaching of the invention is applicable to combustion chambers in general wherein fuel droplets are provided. The invention may also be employed with a wide range of fuels including, but not limited to, JP-4, JP-5, JP-8 and diesel at varying fuel/air mixtures. Also, the teaching of the invention is not intended to be limited to any one particular wavelength or any one particular power level, power density, pulse width, or pulse repetition rate.

Thus, while the invention has been particularly shown and described with respect to an exemplary embodiment thereof, it will be understood by those skilled in the art that changes in form and details may be made therein without departing from the scope and the spirit of the invention.

What is claimed is:

1. A method of igniting an air/fuel spray comprised of fuel droplets, the method comprising the steps of:

provide an air/fuel spray within a combustion chamber means;

introducing at least one pulse of coherent radiation into the air/fuel spray, the pulse interacting with free electrons and initiating a development of a plasma within the air/fuel spray;

maintaining the pulse of coherent radiation for pumping the developing plasma; and terminating the pulse of coherent radiation at a time after the plasma has reached a predetermined energy and before a time that an ignition of the air/fuel spray occurs; wherein the step of introducing includes a step of operating a feedback means that is responsive to a presence of a flame within the combustion chamber means for introducing pulses of coherent radiation into the combustion chamber means at least until the presence of a flame is detected.

2. A method as set forth in claim 1 wherein the steps of introducing and maintaining each include a step of focussing the pulse of coherent radiation within the air/fuel spray.

3. A method as set forth in claim 1 wherein the predetermined energy is an energy at which the plasma becomes self-sustaining.

4. A method as set forth in claim 1 wherein the at least one pulse of coherent radiation has a wavelength within a range of approximately 0.3 micrometers to approximately 1.1 micrometers, a pulse width within a range of approximately 5 nanoseconds to approximately 50 nanoseconds, and a power density within a range of approximately $10^7$ W/cm$^2$ to approximately $10^8$ W/cm$^2$.

* * * * *